United States Patent
Szymanski et al.

[15] 3,698,739
[45] Oct. 17, 1972

[54] EXTENDABLE SELF-ALIGNING TRAILER HITCH

[72] Inventors: Leonard W. Szymanski, Niles; Joseph A. Slaski, Elmwood Park, both of Ill.

[73] Assignee: Lift Parts Mfg., Inc., Elk Grove Township, Ill.

[22] Filed: March 4, 1971

[21] Appl. No.: 120,874

[52] U.S. Cl. .................................280/478 B
[51] Int. Cl. ...................................B60d 7/00
[58] Field of Search...280/478 A, 478 B, 478 R, 479 R, 280/482

[56] References Cited

UNITED STATES PATENTS

| | | |
|---|---|---|
| 3,612,576 | 10/1971 | Marler ....................280/478 B |
| 3,521,908 | 7/1970 | Carter ....................280/479 R |
| 3,329,445 | 7/1967 | Carson ....................280/478 |
| 3,083,986 | 4/1963 | Moody et al. ..........280/482 X |
| 3,397,900 | 8/1968 | Sturges ..................280/478 R |
| 2,973,971 | 3/1961 | Oddson ..................280/478 B |

*Primary Examiner*—Leo Friaglia
*Attorney*—Kegan, Kegan & Berkman

[57] ABSTRACT

A trailer hitch for attachment to a powered vehicle to couple the vehicle to a trailer to be towed, the hitch being characterized in that it is both longitudinally shiftable and laterally swingable and includes automatic bearing means for centering and aligning the aligner bar of the hitch and automatic locking means for securing the aligner bar in its retracted position.

9 Claims, 6 Drawing Figures

PATENTED OCT 17 1972

INVENTORS
LEONARD W. SZYMANSKI
JOSEPH A. SLASKI

BY Kegan, Kegan & Berkman
ATTYS.

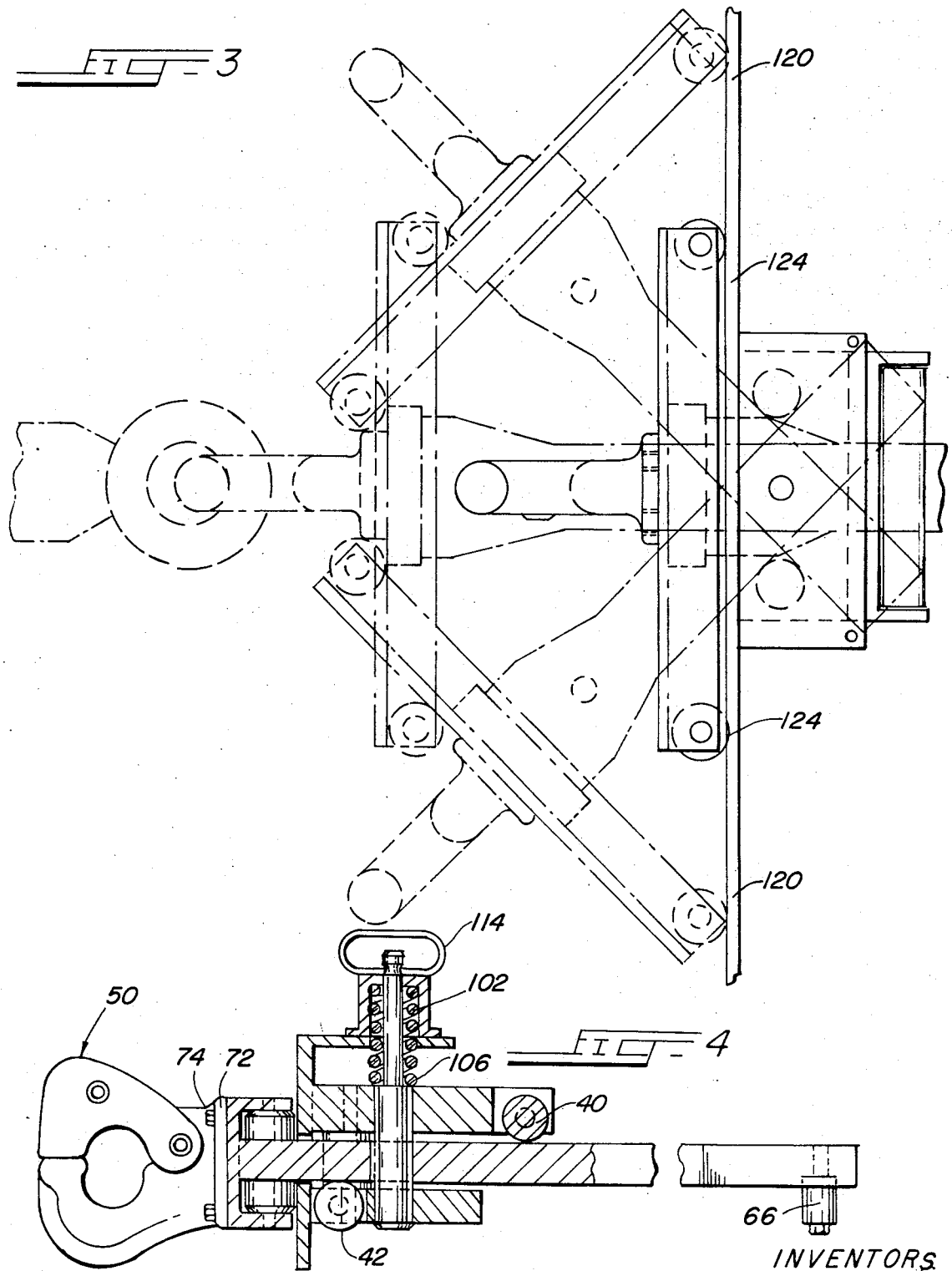

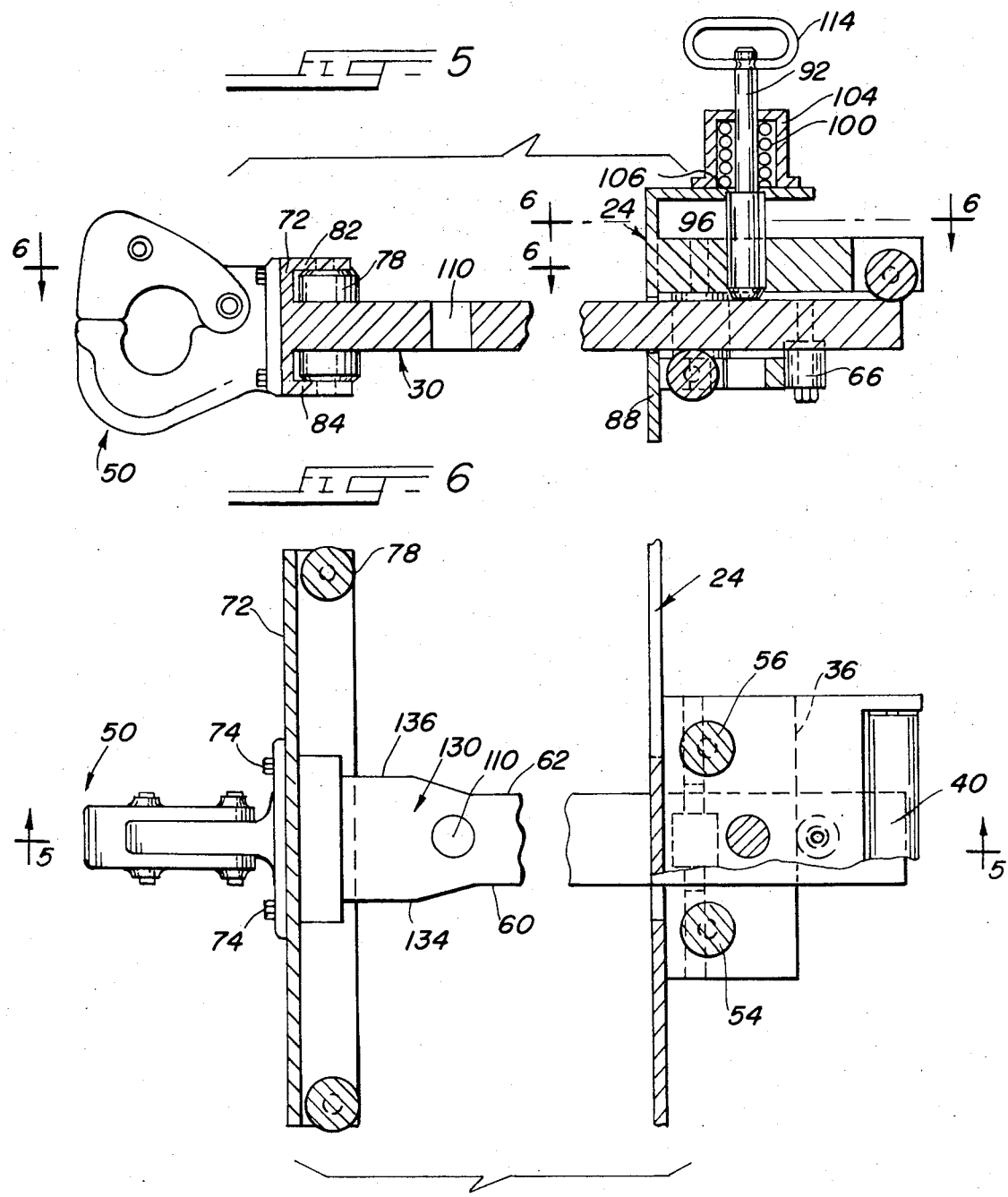

EXTENDABLE SELF-ALIGNING TRAILER HITCH

The present invention relates generally to improvements in trailer hitches of the type adapted for attachment to a powered vehicle such as a tractor and the like for coupling of the vehicle to a trailer to be towed. More particularly, the invention is directed to a trailer hitch which includes a longitudinally shiftable and laterally swingable aligner bar to direct and guide the bar from an extended, laterally off-set position to a retracted, in-line position. The hitch of the invention is particularly useful in the coupling of a prime mover or tractor to a heavy trailer, although the advantages of the present invention are realized in many other applications.

Tractors of the type widely used by the armed forces are ordinarily equipped with a pintle that must be opened manually in order to connect the tow bar of the trailer to the pintle. The pintle must then be locked manually before the trailer can be towed. In order to effect these steps, the driver must maneuver the tractor so that the pintle is aligned as closely as possible with the trailer tow bar eye. He must then dismount from the tractor, open the pintle, and manually shift the tow bar of the trailer so that the tow bar eye can be inserted into the pintle. Since many of the trailers involved weigh as much as 8,000 pounds, this lateral shifting of the vehicle-connected tow bar may prove most difficult. It is therefore, the aim of the present invention to provide a trailer hitch of improved and simplified structure which will obviate any need for swinging the tow bar of a trailer, and which will eliminate the need for extraordinary precision and alignment between the tractor and the trailer in order to effect coupling.

It is a principal object of the invention to provide a trailer hitch which affords the operator a considerable degree of physical latitude in coupling procedures.

A related object of the invention is to provide a trailer hitch in which an aligner bar is not only extensible and retractable but also shiftable laterally through an arc extending about 90° to either side of a mid-lateral position.

Yet another object of the invention is to provide a trailer hitch which, subsequent to coupling of a trailer to a towing tractor, is automatically shiftable from an extended and laterally off-set position to a mid-lateral in-line and retracted position for towing.

A related object of the invention is to provide in an extensible and laterally shiftable aligner bar of a trailer hitch low friction guide means to facilitate centering an alignment of the bar preparatory to towing.

A further object of the invention is to provide automatic means for locking the extensible aligner bar in a retracted position during towing operations.

It is, generally, the object of the present invention to provide an improved trailer hitch which will eliminate any necessity on the part of the operator to move the trailer by hand in order to intercouple the trailer tow bar with the tractor pintle.

Other and further objects, aims and advantages of the invention will become apparent from a reading of the following specification taken in conjunction with the drawing in which:

FIG. 3 is a top plan view of the trailer hitch of FIG. 1 with the broken lines illustrating the lateral movement and positioning of the aligner bar in its extended position;

FIG. 4 is a cross-sectional view of the trailer hitch taken substantially on the line 4—4 of FIG. 1;

FIG. 5 is a view similar to that of FIG. 4 but with the hitch in an extended position; and FIG. 6 is a top plan view taken substantially on the line 6—6 of FIG. 5.

Figure 1:
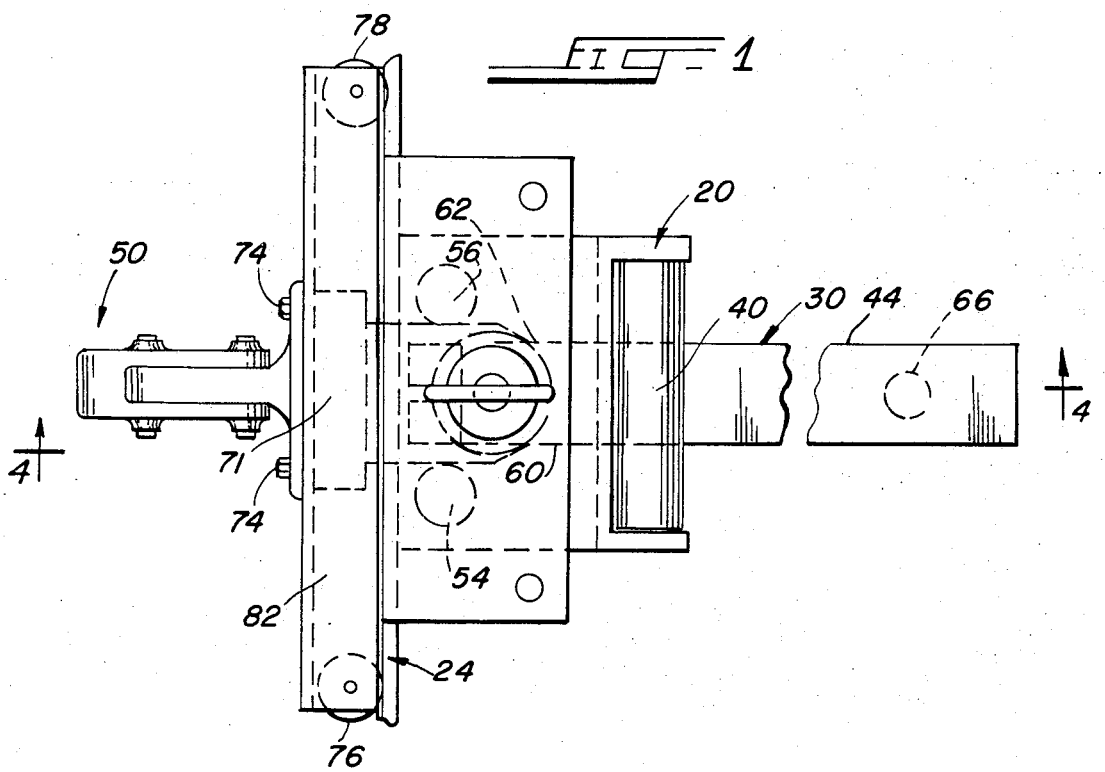
FIG. 1 is a top plan view of a trailer hitch in accordance with the present invention and showing cooperating laterally disposed bearings for guiding the longitudinally shiftable aligner bar.

The trailer hitch of the invention is readily attachable to a tractor, truck, or other prime mover or towing vehicle without any major alterations or modification of that vehicle. The bearing and guide elements of the hitch assembly are not subjected to any pulling stresses during the towing of the trailer by the powered vehicle, all stresses being taken up by the tongue and the pintle assembly, in the usual manner.

Referring now to the drawing, and particularly to FIGS. 1–6, for purposes of illustrative disclosure, a preferred embodiment of one form of the invention is shown as a trailer hitch assembly 20 in its retracted position. The assembly 20 includes a laterally extending mounting plate or structural L-bar 24 by means of which the hitch is bolted or otherwise secured to the draw bar of a tractor, truck or prime mover. At its lateral mid point the L-bar 24 is formed with an opening through which a longitudinally shiftable aligner bar 30 extends.

Welded to or otherwise secured to the L-bar 24 at vertically spaced positions above and below the aligner bar 30 are aligner bar guide and support brackets 34 and 36 each provided with low friction means in the form of roller bearings 40 and 42 which contact respectively, upper and lower surfaces 44 and 46 of the aligner bar 30. In the preferred embodiment of the invention illustrated, and as seen most clearly in FIG. 2, the bearings are spaced longitudinally so that the upper bearing 40 contacts the aligner bar 30 at a point rearwardly with respect to the contacting point of the lower bearing 42. It will be appreciated that this arrangement affords support for the aligner bar against the vertically impressed stresses of the tow bar (not shown) engaged in a pintle hook 50 which is secured to the forward end of the trailer hitch assembly 20.

Rotatably mounted between the support brackets 34 and 36 is a second set of bearings 54 and 56 disposed at opposite lateral sides 134 and 136 of the aligner bar 30 for contact thereagainst. Thus, the bearings 40 and 42, in conjunction with the bearings 54 and 56, constitute both friction support and guide means during extension and retraction of the aligner bar 30. As seen most clearly in FIG. 2 a boss or stop 66 secured to the aligner bar 30 at the under surface thereof constitutes means limiting the extension of the aligner bar as the stop 66 abuts the end of the bracket 36.

Figure 2:
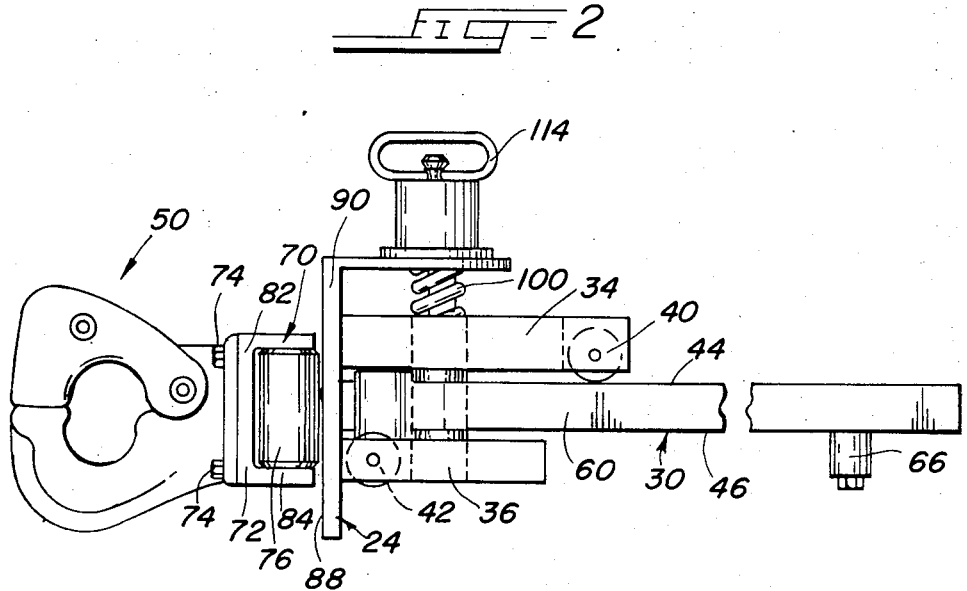
FIG. 2 is a side elevational view of the trailer hitch showing the locking pin assembly for securing the aligner bar fixed in position during towing operation.

A rearwardly opening laterally extending generally U-shaped channel 70 is secured by welding or any other suitable technique to the forwardly extending end of the aligner bar 30. In the particular embodiment of the invention illustrated, the pintle hook 50 is secured to a block 71 at the forwardmost end of the aligner bar 30 through the vertical component 72 of the channel 70 by means of bolts 74. As illustrated in FIGS. 1, 2, and 6, the pair of bearings 76 and 78 are rotatably supported in the channel 70 at opposed lateral ends thereof, the bearings themselves projecting somewhat rearwardly of the upper and lower channel plates 82 and 84, so that with the aligner bar in its retracted position (FIGS. 1 and 2), the bearing 76 and 78 abut the forward face or surface 88 of the vertically disposed horizontally extending plate 90 of the L-shaped bar 124. A spring-loaded locking pin 92 is secured to the horizontally extending member 96 of the L-shaped bar 124 so that a spring 100 confined within a housing 104 bears upon an annular shoulder 106 of the pin 92 to urge the pin resiliently downwardly, as shown in FIG. 5. The aligner bar 30 is formed with a downwardly extending opening 110 so that with the aligner bar 30 completely retracted and the bearings 76 and 78 abutting the face 88 of the L-shaped plate 24, the opening 110 is in vertical correspondence with the pin 92, whereupon the spring 100 urges the pin to seat in the opening 110 and to lock the aligner bar 30 against longitudinal displacement (FIG. 4). When it is desired to extend the aligner bar 30, it is necessary only to withdraw the pin 92 from the opening 110, a handle 114 being provided for this purpose.

It will be appreciated from the foregoing description that the aligner bar 30 can be easily unlocked and then extended longitudinally, by hand. In its extended position and as indicated schematically in FIG. 3, the aligner bar 30 may be pivoted through an angle extending about 90° to either side of a mid-line or center position. Thus, when a driver desires to tow a trailer, he maneuvers the tractor so that the eye on the end of the trailer tow bar is within that area traversable by the extendible and pivotal aligner bar 30 of the hitch of the present invention. This physical relationship between the tow bar eye and the hitch assembly having been achieved, the driver gets off of the tractor, opens the pintle 50, unlocks the pintle bar, lifts the tow bar (not shown) to the height of the pintle, and extends the aligner bar supported pintle 50 until the tow bar eye is insertable into the pintle 50.

Utilizing the improved hitch assembly of the invention, there is no necessity to move the heavy trailer by hand in order to couple the tow bar to the pintle. With the tow bar engaged in the pintle, the driver need only move the tractor in reverse or forward and reverse and, irrespective of the angular relationship existing, the aligner bar 30, bearing on the roller 78 (or the roller 76) and guided by the rollers 56 and 54 will retract into its housing and assume an in-line or mid-line position. It will be appreciated upon a consideration of FIG. 3, that in traversing its realignment course from its angularly shifted position to an in-line position, the bearing 78 (or 76) will ride upon and be guided by the plate 24, moving from a lateral extremity 120 of the plate 24 to a mid-line or reference position 124. With the aligner bar at the mid-line position and fully retracted, the locking pin 92 will drop into place in the opening 110 and secure the aligner bar 30 against axial or longitudinal displacement during the towing operation.

As clearly indicated in FIGS. 1 and 6, the aligner bar 30 includes at its forward end an outwardly flared section 130 the lateral or side walls 134 and 136 of which come into contacting abutment with respective bearings 54 and 56 when the aligner bar is in its fully retracted position. Thus, the bearings 54 and 56 preclude lateral shifting or pivotal movement of the aligner bar 30 when the latter is fully retracted (FIG. 1). However, with the aligner bar 30 extended, the bearings 54 and 56 are disposed opposite a more narrow portion of the aligner bar, between walls 60 and 62, and lateral or pivotal shifting of the bar 30 from side to side is feasible, as indicated schematically in FIG. 3.

While a preferred commercial embodiment of the novel hitch of the invention has been illustrated and described, it is understood that the same is capable of modification and such modifications may be made without departure from the spirit and scope of the invention as defined in the appended claims.

What is claimed is:

1. A trailer hitch adapted for attachment to a powered vehicle such as a tractor and the like for coupling of said vehicle to a trailer to be towed, said hitch including, in combination:

a longitudinally extendable and laterally swingable aligner bar, an extensible end of said aligner bar being adapted to carry coupling means for connecting to a draft tongue of a trailer to be towed, frame means for securing said aligner bar to said powered vehicle, first bearing means carried by said frame means and fixed with respect thereto, said first bearing means including upper and lower bearing elements carried by said frame means and disposed above and below said aligner bar to straddle and abut said bar and to provide support means and low-friction guide means for said bar during extension and retraction thereof, said bearing elements being effective to limit arcuate displacement of said aligner bar in vertically extending planes, second bearing means supported on said frame means and constituting a pair of bearing elements carried at opposed lateral sides of said aligner bar proximate thereto, said second bearing means being fixed with respect to said frame means, third bearing means carried by and shiftable with said aligner bar and supported to project at opposite sides thereof at positions displaced laterally outwardly of respective said second bearing means, said second and said third bearing means comprising, in combination, friction-limiting abutment and guide means for said aligner bar to direct and to guide said bar in traversing a retraction and alignment course between a laterally off-set, extended position of said aligner bar and a mid-lateral, inline retracted position.

2. The structure as set forth in claim 1 wherein said aligner bar is shiftable arcuately through an angle embracing a sector extending about 90° to either side of a mid-line position of said aligner bar.

3. The structure as set forth in claim 1 and further comprising vertically shiftable pin means adapted to move selectively into and out of registering transverse openings in said frame means and said aligner bar to lock said bar against longitudinal displacement to preclude extension and retraction thereof during towing operations.

4. The structure as set forth in claim 3 and further comprising yielding spring means and means supporting said spring means, whereby said spring means normally urges said pin means into a position of interlocking engagement with said frame means and said aligner bar to preclude relative movement therebetween.

5. The structure as set forth in claim 1 wherein said second bearing means constitute opposed abutment means precluding lateral shifting of said aligner bar when said aligner bar is locked in a retracted position.

6. The structure as set forth in claim 1 and further comprising laterally projecting, vertically extending abutment plate means on which one of said third bearing means rides during forcible arcuate realignment of said aligner bar from a laterally off-set to an in-line position.

7. The structure as set forth in claim 1 wherein said upper and lower bearing elements are disposed longitudinally along said aligner bar with said upper bearing element occupying a position rearwardly of said lower bearing element; whereby said upper and lower bearing elements limit pivotally downward displacement of said coupling means carried by said aligner bar at an end thereof.

8. The structure as set forth in claim 1 wherein said aligner bar includes longitudinally arrayed first and second zones extending linearly along the length of said bar, said first of said zones constituting a forward end portion of said bar and being of a lateral width to bring opposed side walls of said bar into substantially abutting contact with respective opposed elements of said second bearing means, thereby effectively to preclude lateral arcuate shifting of said bar when in a retracted position, said second of said zones being disposed axially rearwardly of said first of said zones and having a reduced lateral width as compared with said first of said zones;

whereby said aligner bar is shiftable laterally arcuately between limits controlled by said second bearing means when said aligner bar is extended to bring said first zone beyond said second bearing means and to bring said second zone to a position between and opposite said second bearing means.

9. In a trailer hitch adapted for attachment to a powered vehicle such as a tractor and the like for coupling of said vehicle to a trailer to be towed, and including, in combination:

a longitudinally extendable and laterally swingable aligner bar, an extensible end of said aligner bar being adapted to carry coupling means for connecting to a draft tongue of a trailer to be towed, frame means for securing said aligner bar to said powered vehicle, first bearing means carried by said frame means and fixed with respect thereto, said first bearing means constituting guide and support means for said aligner bar during extension and retraction thereof and limiting displacement of said aligner bar in vertically extending planes, second bearing means supported on said frame means and constituting a pair of bearing elements carried at opposed lateral sides of said aligner bar proximate thereto, said second bearing means being fixed with respect to said frame means;

the improvement comprising:

a crossbar carried by and rigidly fixed to said aligner bar and extending transversely thereof in a generally horizontal plane, said crossbar being secured to a forwardly extending portion of said aligner bar and projecting laterally to either side thereof, third bearing means shiftable with said aligner bar and supported to project at opposite sides thereof, said third bearing means being carried by said crossbar adjacent opposed lateral extremities thereof, an abutment plate fixed to and extending laterally across said frame means of said hitch in a generally horizontal plane at a height establishing vertical correspondence of said abutment plate with said crossbar and with said bearing means carried thereby to render said third bearing means physically engageable with said abutment plate, whereby upon retraction of said aligner bar from an extended position inwardly into said hitch said third bearing means functions to abut, bear against, and ride upon said abutment plate to facilitate arcuate realignment of said aligner bar from a laterally off-set extended position to a mid-lateral in-line position.

* * * * *